March 23, 1965 C. C. CUTLER 3,175,051

ECHO SUPPRESSOR USING COMB FILTERS

Filed Dec. 16, 1960 2 Sheets-Sheet 1

INVENTOR
C. C. CUTLER
BY [signature]
ATTORNEY

ECHO SUPPRESSOR USING COMB FILTERS

Filed Dec. 16, 1960

2 Sheets-Sheet 2

INVENTOR
C. C. CUTLER
BY [signature]
ATTORNEY

United States Patent Office 3,175,051
Patented Mar. 23, 1965

3,175,051

ECHO SUPPRESSOR USING COMB FILTERS

Cassius C. Cutler, Gillette, N.J., assignor to Bell Telephone Laboratories, Incorporated, New York, N.Y., a corporation of New York Filed Dec. 16, 1960, Ser. No. 76,325
3 Claims. (Cl. 179—170.2)

This invention relates to an echo suppressor for use in two-way transmission systems involving both two-wire and four-wire links and more particularly to echo suppressors for use in such systems when the path delays are greater than those heretofore encountered.

As is well known in the art, it is the usual practice in telephone transmission systems to interconnect two-wire local lines by way of four-wire circuits. Such a mixed system is particularly common where local terminals are joined by way of radio facilities. The four-wire system provides two separate one-way paths for the transmission and the reception of signal energy between stations while the two-wire local circuit provides a single two-way path. When energy is transmitted to a two-wire local line by one of the paths of the four-wire circuit, a part of the transmitted signal returns over the other path of the four-wire system. This occurs even though the two facilities are interconnected by way of hybrid networks. This characteristic of two-wire to four-wire communication systems gives rise to echoes since the signal energy is returned to the speaker.

If the returned echo signal has a delay of less than 50 milliseconds, it is known that the echo will not present any difficulties. However, certain transmission systems now proposed, such as that employing an earth satellite as a repeater station, or a transmission system utilizing long lines for the transmission of the signal energy, can cause delays of signal energy up to 0.6 second. Failure to provide for attenuation of the echo will lead to disastrous results since the speaker using the system will always get an earful of the syllables of his last talk spurt. Echo suppressors have accordingly been provided and have formed a partial solution to the problem under some circumstances.

For example, so-called split echo suppressors have been used in prior transmission systems to reduce echoes; one suppressor being placed near one talker, the other suppressor being placed near the other talker. When one talker begins to speak the echo suppressor near the other talker will be energized and will disable the return path of the four-wire system. This type of suppressor has been found to work well with signals of small delay; however, serious complications arise when this type of suppressor is used in transmission systems, such as the aforementioned types, wherein there is large delay time. An example will fully illustrate the disadvantages of this type of suppressor for use in transmission systems having a long delay characteristic.

Suppose there is a 0.6 second round trip delay in the transmission path between stations. If both speakers began to speak at approximately the same time, both split suppressors would be energized to short out both paths; therefore, words or parts of words would be lost because neither speaker knows the other person is talking until at least 0.3 second after the speaker has begun to talk. To alleviate this situation break-in means have been provided for use with these split echo suppressors to enable each talker to gain control of the circuit even though the other person is speaking. However, this arrangement has the attendant disadvantage that any benefit derived from the suppressors will be lost as the echo will be allowed to return to the originating speaker.

cannot distinguish the answer from the echo. Thus the break-in means can be actuated by the echo itself, again allowing the echo to come back to the speaker. The hangover time of these echo suppressors could be increased to equal the round trip delay of the system; however, parts of the answer would be cut out. Therefore this solution is not feasible.

Another objection to the echo suppressors now in use is that they require a substantial amount of equipment, i.e., a detector to detect the signal, an amplifier to amplify the signal and the means for disabling the return path.

Accordingly, it is an object of the present invention to provide an echo suppressor which will satisfactorily attenuate echoes in a combined two-wire and four-wire system having an inherent long delay time characteristic.

Another object of the present invention is to reduce the complexity of echo suppressors and to obtain improved performance with a minimum of equipment and attendant circuitry for the operation thereof.

In accordance with the present invention the basic echo suppressor comprises two comb filters. These comb filters have a response characteristic such that there are many alternate stop (or attenuation) and pass bands throughout the frequency range for which the particular filter is designed. The attenuation bands of one comb filter are chosen to be in alignment with the pass bands of the second comb filter for any given frequency in the band of signal energy which is to be transmitted between the stations. One filter is placed in one of the transmission paths of the four-wire system; the other filter is placed in the other transmission path of the four-wire system. Thus any signal within the frequency range of the two filters will be attenuated during the round trip between stations by either one or the other of the filters. Therefore, any echo which might arise in the two-wire local system and be returned via the other path of the four-wire system will be completely attenuated before it reaches the talker.

It is a well-known fact that ordinary speech is composed of many frequencies. Likewise, it is also a well-known fact that if some of the frequencies in normal speech energy are attenuated, the speech will still be intelligible to the listener. This fact is made use of in the present invention.

In another embodiment of the present invention the response characteristics of the two comb filters are such that the successive attenuation and pass bands at the low frequency end of the frequency band of the signal to be transmitted are narrower and thus more closely spaced than at the high frequency end of the band.

In still another embodiment of the present invention the comb filters are used in conjunction with existing echo suppressors.

The above and other features will be described in the following specification taken in conjunction with the drawings in which.

Figure 1:
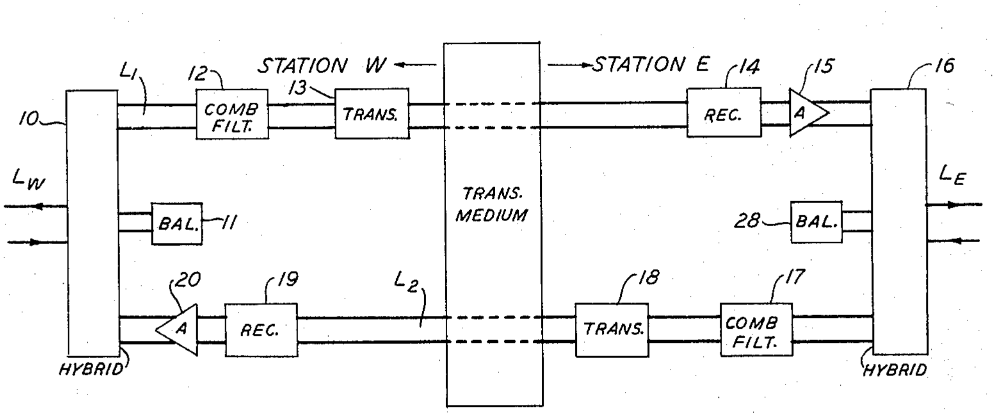
FIG. 1 is a schematic circuit diagram of a transmission system utilizing the comb filter echo suppressor of the present invention.
Figure 4:
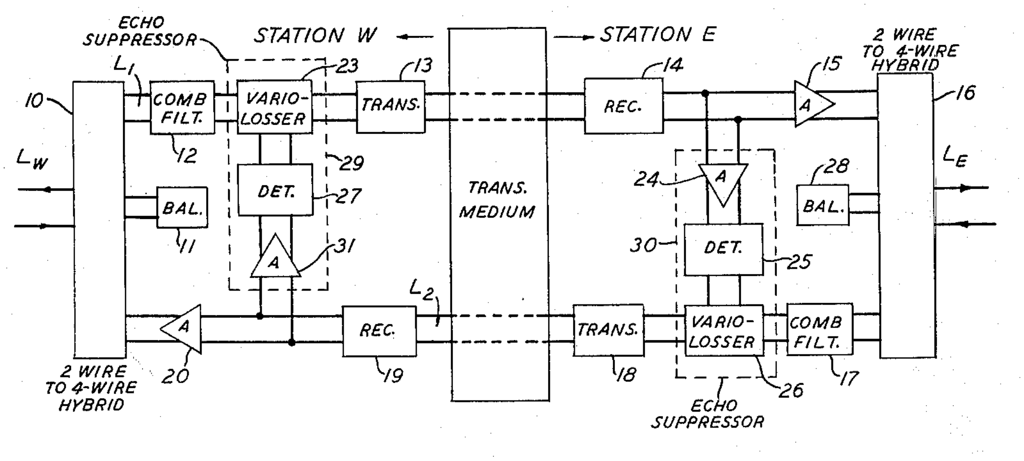
Figure 2A:
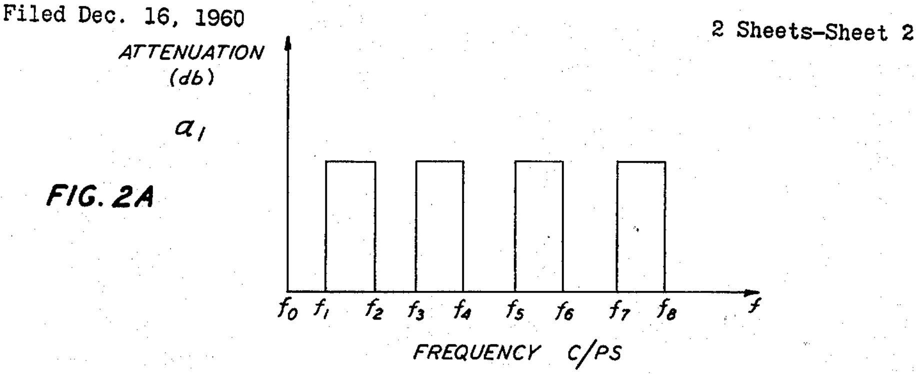
FIGS. 2A and 2B are graphs of the attenuation characteristics of the respective comb filters of FIG. 1.
Figure 2B:
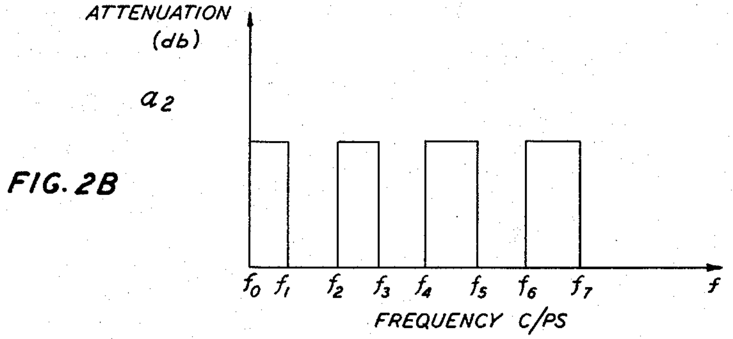
Figure 3A:
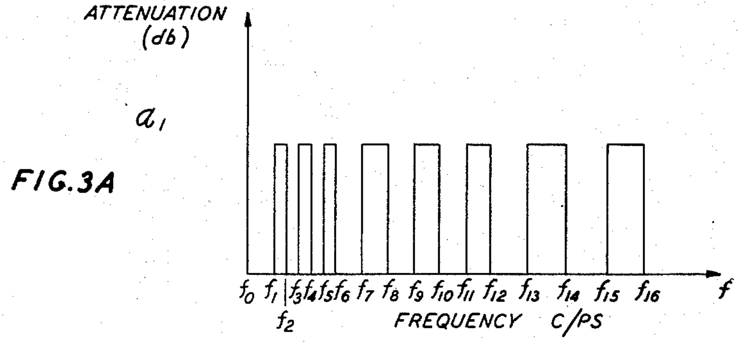
Figure 3B:
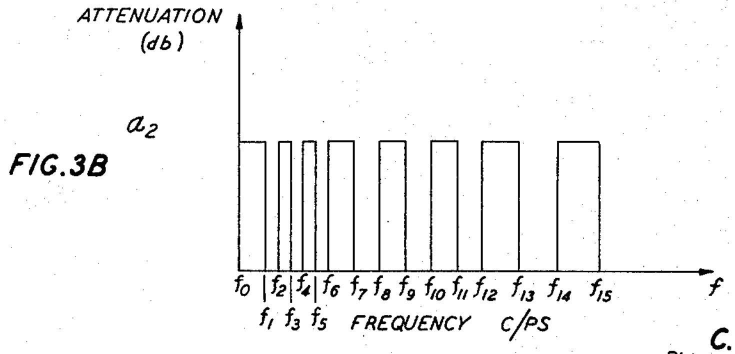
Figure 1:
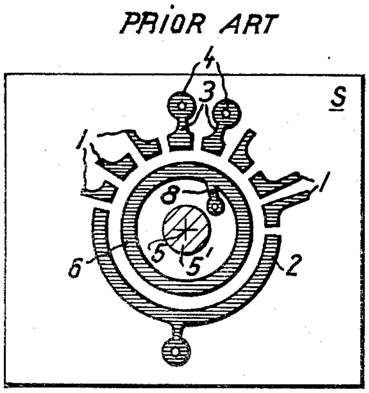
Fig.1 PRIOR ART
Figure 2:
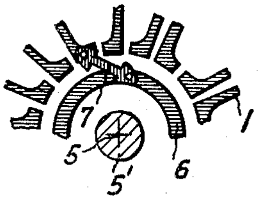
Figure 3:
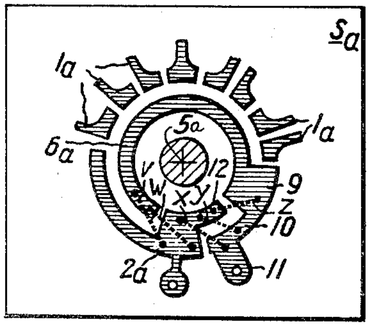
Figure 4:
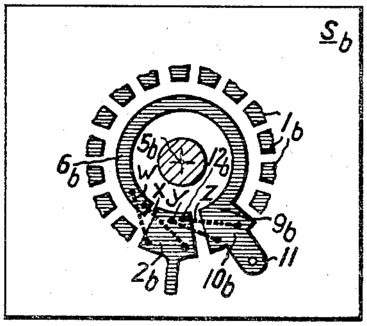
Figure 5:
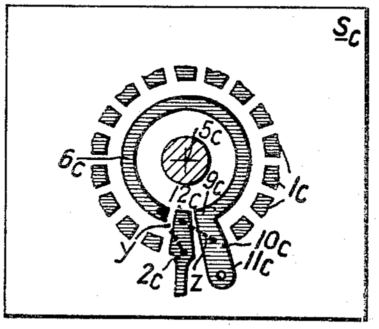

FIGS. 3A and 3B are other graphs of the attenuation characteristics of the modified comb filters which may be employed in the circuit of FIG. 1; and FIG. 4 is a schematic circuit diagram of a modification of the invention wherein the comb filters are employed in combination with a conventional echo suppressor. Like characters of reference in the several figures of the drawing correspond to the same elements.

In the following specification the speaker producing the

March 23, 1965 W. E. LUDWIG 3,175,052

MULTIPLE-POSITION ROTARY STEPPING SWITCH HAVING
AN OBLIQUELY ORIENTED CONTACT BRIDGE
Filed July 20, 1961

Inventor:
Willi E. Ludwig
By: George H. Spencer
Attorney